Oct. 27, 1970     M. SPIVACK     3,536,386

CONTACT LENS WITH SIMULATED IRIS

Filed Oct. 27, 1967     2 Sheets-Sheet 1

INVENTOR.
MORRIS SPIVACK

BY *Lucien L. Lelling*

ATTORNEY

Oct. 27, 1970    M. SPIVACK    3,536,386
CONTACT LENS WITH SIMULATED IRIS
Filed Oct. 27, 1967    2 Sheets-Sheet 2

INVENTOR.
MORRIS SPIVACK
BY
ATTORNEY

United States Patent Office 3,536,386
Patented Oct. 27, 1970

3,536,386
CONTACT LENS WITH SIMULATED IRIS
Morris Spivack, 200 E. 58th St.,
New York, N.Y. 10022
Filed Oct. 27, 1967, Ser. No. 678,682
Int. Cl. G02c 7/04
U.S. Cl. 351—160         1 Claim

ABSTRACT OF THE DISCLOSURE

A contact lens for cosmetic and therapeutic purposes, wherein a pair of generally circular lens parts are intimately secured in facing relation with at least a partially opaque imprinting sandwich therebetween simulating a human iris and leaving a clear central area, so that the iris-simulating region covers the wearer's iris and the central region passes refracted light for therapeutic purposes.

BACKGROUND OF THE INVENTION

As is well known to those versed in the art, cosmetic corneal contact lenses have, in the past, been manufactured of colored or tinted transparent material, so that colored light is passed to the warer's eyes, and the wearer's iris is exposed to view through the colored or tinted lens. In many cases this was unsatisfactory, since the color of the patient's iris could be modified or altered only to a limited degree. Thus the objective to be achieved was frustrated when seeking to conceal an unattractive iris, or a dark-color iris is to be made to appear lighter in color. In addition, "ghost images" have been evident in an appreciable number of cases.

In another type of cosmetic corneal contact lens, an annular centrally open lens part may be colored or opaque, and a central core or plug of clear material is bonded in the opening of the outer part. This is an extremely expensive and time-consuming procedure, often uncomfortable and otherwise unsatisfactory in use, and lacking durability for a reasonable useful life.

These and other types of cosmetic corneal contact lenses have not found wide acceptance, for many reasons, including expense, discomfort to the wearer, lack of durability, and for lack of an acceptable esthetic effect.

SUMMARY

Accordingly, it is an important object of the present invention to provide a new and improved corneal contact cosmetic and therapeutic lens, and method of manufacturing the same, which overcome the above-mentioned difficulties in the prior art, and which lens is adapted to naturally and attractively change the apparent color of a person's eyes in an impeccable manner. More specifically, the cosmetic contact lens of the present invention presents the appearance of a perfectly natural-looking iris of any desired color, and is capable of being worn for considerably longer periods of time than prior cosmetic contact lenses, periods comparable to conventional contact lens wear.

It is a further object of the present invention to provide a cosmetic corneal contact lens which exposes less of the cornea, to greatly reduce the discomfort and unpleasantries of dust and wind.

It is another object of the present invention to provide a cosmetic therapeutic contact lens of the type described wherein the aperture of the lens may be selected from a wide range to suit the needs of substantially all persons, for example, through an aperture range from 2 mm. to 9 mm.

Still another, more particular, object of the present invention resides in the provision of a cosmetic therapeutic contact lens affording more normal introduction of light to the wearer's eye by providing a translucent or semitransparent annular region intermediate the pupillary and iris regions, thereby enhancing the functional and therapeutic refractive effect of the central pupillary region.

It is still a further object of the present invention to provide a cosmetic therapeutic contact lens which effectively conceals and attractively presents the wearer's eyes, even in the case of blemished or opaque cornea, heterochromia, aniridia, iridectomy, or surgical notching or excision of the iris.

It is still another object of the present invention to provide a cosmetic therapeutic contact lens having the advantageous characteristics mentioned in the preceding paragraphs, which is effective in its application to albino cases or extremely light-sensitive cases, wherein the pinhole or small pupillary aperture shuts out detrimental rays of light to improve vision.

It is still a further object of the present invention to provide a cosmetic therapeutic contact lens which effectively eliminates scintillations of light, ghost images and flare particularly prevalent at night around beams of light.

Still another object of the present invention is the provision of a cosmetic therapeutic bifocal lens for presbyopes and aphakics with a single viewing area or prescription, by modification of the general-prescription and by the depth of focus principle. Heretofore, generally two distinct viewing areas or portions of the lens were necessary to create a bifocal, bringing multiple problems in the fitting and adaptation of the lens, but two different viewing areas are not necessary by the lens of the present invention.

It is another object of the present invention to provide a cosmetic therapeutic lens whereby the fitting and acuity of high-cylinder or astigmatic cases is improved by creating a small aperture, thus eliminating peripheral portions of the cornea which contain the greatest degree of change or cylinder or astigmatic effects.

It is still another object of the present invention to provide a cosmetic therapeutic contact lens which greatly improves the fitting and vision of patients having keratoconus or conical corneas.

Still a further object of the present invention is to provide a therapeutic cosmetic contact lens wherein may be employed the "pinhole" effect to create dramatic improvement in subnormal vision and legally blind patients.

Still another important object of the present invention is to provide a therapeutic cosmetic contact lens for therapy and treatment of congenital nystagmus cases, whereby the patient is forced to look through a restricted opening so that the oscillations or movements of the eye will be limited and slowed down. The reduced movements or oscillations serves to subsequently improve visual acuity, and the therapy is instituted in an everyday, normal, facile manner so that resistance to therapy will be effectively eliminated.

It is still another object of the present invention to provide a therapeutic cosmetic contact lens which effectively eliminates scintillation, flare and "ghost images" experienced by aphakic patients in wearing conventional lenticular aphakic lenses. In the present lens construction, bevels or truncations necessary to the fitting of an aphakic case, or any other case, are hidden by the opaque area, and thus never in the line of sight of the wearer, thus avoiding the aforementioned detrimental effects.

It is still a further object of the present invention to provide a cosmetic therapeutic contact-lens construction which serves to extend the wearing time of conventional sport lenses, as well as such lenses used in swimming, and other such activities.

Other objects of the present invention will become apparent upon reading the following specification and referring to the accommpanying drawing, which form a material part of this disclosure.

The invention accordingly consists in the process and method steps and features of construction, combinations of elements, and arrangements of parts, which will be exemplified in the construction hereinafter described, and of which the scope will be indicated by the appended claim.

DESCRIPTION OF THE PREFERRED EMBODIMENTS

Figure 1:
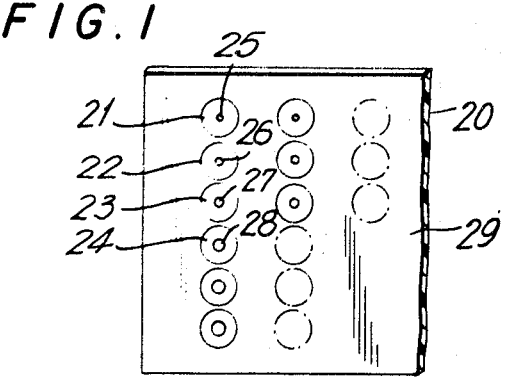
FIG. 1 is a partial front perspective view showing an initial stage in manufacture of contact lenses of the present invention.
Figure 2:
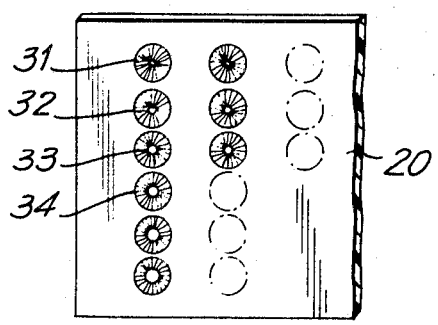
FIG. 2 is a front perspective view showing a later stage in manufacture of the instant contact lenses.
Figure 5:
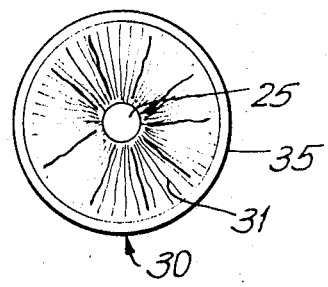
FIG. 5 is a later stage in the manufacture of a contact lens of the present invention from the intermediate product of FIG. 2.

Referring now more particularly to the drawings, and specifically to FIGS. 1, 2 and 5 thereof, in FIG. 1 is shown a sheet 20 of clear, transparent plastic material, suitable for use in manufacture of contact lenses, of a constant thickness, say between .07 mm. to .50 mm. Acrylic plastic, more particularly methyl methacrylate, has been found satisfactory for use in the sheet 20, but other suitable material may be employed.

The sheet 20 is imprinted on one face 29 with a series or row of annuli 21, 22, 23 and 24, the imprinting medium being opaque and of vegetable matter, or other nontoxic and non-irritating character. The external diameters of the several opaque imprinted annuli 21–24 may be identical, while the internal diameters thereof are advantageously of successively increasing sizes, say the central region 25 of opaque imprinting 21 being of about 2 mm. diameter, and the central regions 26, 27 and 28 of respective opaque imprints 22, 23 and 24 being of successively larger diameter, so that the largest internal diameter of opaque imprint is about 8 mm.

By photographic procedures, say photolithography, a picture taken of a desired iris is imprinted on each opaque imprint 21–24, to produce the iris imprints 31, 32, 33 and 34 of FIG. 2. The iris imprints are of annular configuration, and may all have the same external diameter, but are of successively increasing internal diameters in correspondence with the internal diameters 25–28. This may be accomplished by any suitable procedure, say by punching or otherwise removing the central or pupillary area of the positive transparency from which the printing plate is made. It will also be appreciated that the iris imprints 31–34 may be accomplished by other printing processes including silk screening.

A truly natural color photograph of unit magnification of the iris may be obtained by the use of oblique-angled lighting and polaroid filters to eliminate Purkinje images and reflections, and suitable means may be employed to constrict the pupil. In producing the iris imprints 31–34, an ink or printing medium of non-toxic and non-irritating character is employed. The ink thickness is negligible. If desired, variations and modifications of color and hue of iris may be achieved in the inking procedure.

As thus far described, the iris imprints 31–34 are superposed, respectively, on the opaque imprints 21–24, the latter advantageously being white to preclude color distortion of the iris imprint. Of course, other than white may be employed for the opaque imprints 21–24, if desired for unusual effects.

The several imprinted areas of sheet 20 may then be removed, as by die-cutting, to produce a plurality of sheet portions or lens parts 30, of generally circular-outline configuration, each having one face provided with the iris-simulating imprint, as at 31. The central region 25 of lens part 30 remains clear, and a clear peripheral border or margin 35 may extend about the lens part 30, for the purposes hereinafter described.

Figure 8:
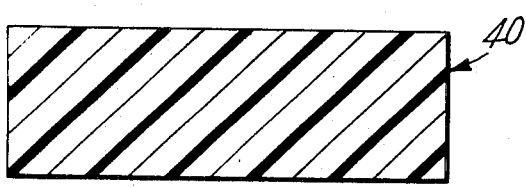
FIG. 8 is a sectional view showing an early stage in the manufacture of another component part of the instant contact lens.
Figure 9:
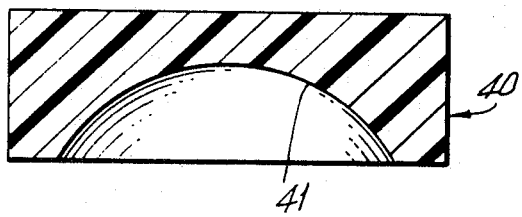
FIG. 9 is a sectional view showing a later stage in manufacture of the component part of FIG. 8.

An additional lens part or component is shown in an early stage of manufacture in FIG. 8, and there generally designated 40. The component 40 may be a disc of suitable clear material, such as acrylic plastic, or other, and may be subsequently finished on its opposite sides to define a concave face 41, and a convex face 42.

Figure 10:
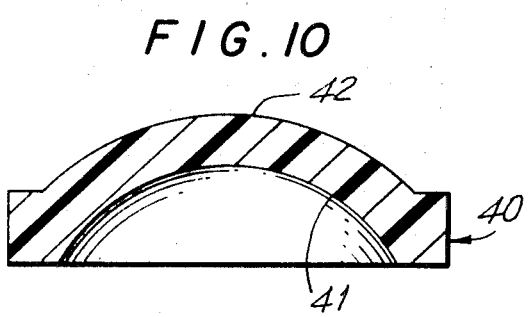
FIG. 10 is a sectional view showing still a later stage in manufacture of the component part of FIGS. 8 and 9.
Figure 12:
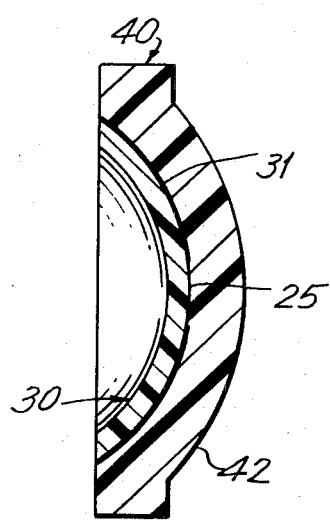
FIG. 12 is a later stage in manufacture of the assembly of FIG. 11.

In the condition of FIG. 10, the lens part 40 is assembled with lens part 30, with the face 29 of lens part 30, which carries the iris-simulating imprint 31, facing toward the concave face 41 of the lens part 40. By suitable heat and/or pressure the lens part 30 is deformed, its face 29 becoming convex of a contour complementary to the concave face 41 of part 40, and is suitably bonded in intimate facing engagement therewith, as by heat, catalyst, or other. This condition is shown in FIG. 12. It will there appear that the annular imprint 31 is completely sandwished between and in sealed relation within the bonded outer- and inner-lens parts 40 and 30. Further, the central region 25 remains clear to define a pupillary area in the finished lens.

Figure 13:
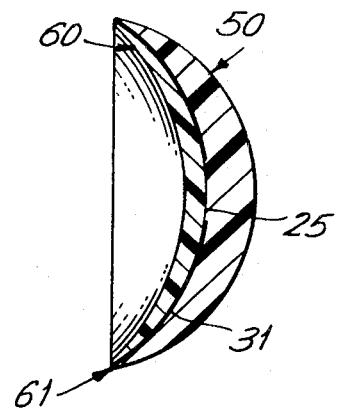
FIG. 13 is a sectional view showing a completed contact lens of the present invention.

Upon further forming to prescribed dimensions, a contact lens in finished condition will result, as at 50 in FIG. 13. It will there be apparent that the margin 35 of lens part 30 has been substantially removed, so that the iris-simulating imprint 31 extends substantially completely across the lens 50, excepting only the clear central pupillary region 25.

The truncations and bevels that are ground into the finished lens may also be seen in FIG. 13. The truncations or bevels 60 generally extend from the periphery 61 of the lens to a point outside the peripheral margin of the pupillary region 25.

Figure 3:
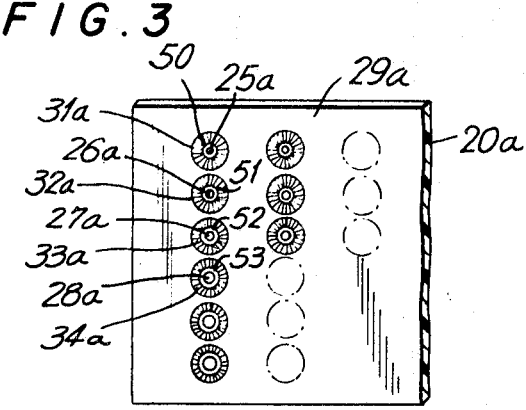
FIG. 3 is a front perspective view showing a slightly modified form of the stage of FIG. 2.
Figure 6:
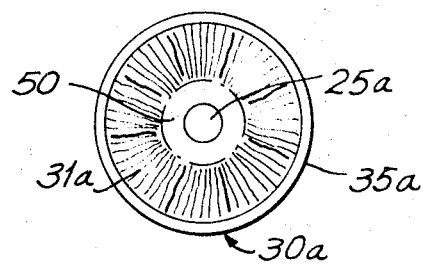
FIG. 6 is a later stage in manufacture of the instant contact lens from the intermediate product of FIG. 3.

In the modification of FIGS. 3 and 6, a clear plastic sheet 20a may be prepared in the same manner as the sheet 20 of FIG. 2. In addition, the face 29a of the sheet 20a is formed centrally of each simulated iris imprint 31a–34a with an intermediate annular region, respectively designated 50, 51, 52 and 53, each located between its central pupillary region and the iris imprint. The intermediate annular regions 50–53 are of a light-transmitting and diffusing character, such as by frosting, screening or grating. The central pupillary regions 25a–28a provide a pin hole aperture which exclude most peripheral rays of light, which produce deleterious effects to the image impinged on the retina. For some purposes, this pin hole aperture provides sufficient light. Under certain circumstances, however, additional light may be required to improve the effect of the pin hole aperture. Such additional light may be provided through an area which permits surrounding light to enter and impinge on the retina but which does not afford clear visual projection therethrough. The frosted or translucent intermediate annular regions 50–53 thus permit an increased amount of requisite light to impinge on the retina and, at the same time, maintaining the beneficial physiological and physical refractive affect inherent in a pin hole aperture such as herein provided for.

The sheet 20a is severed to remove the several imprinted regions thereof, one being shown in FIG. 6 and there generally designated 30a, having a peripheral margin 35a of clear plastic and in intermediate translucent annular region 50 concentric with and interposed between the central pupillary region 25a and annular iris-simulating region 31a.

Figure 4:
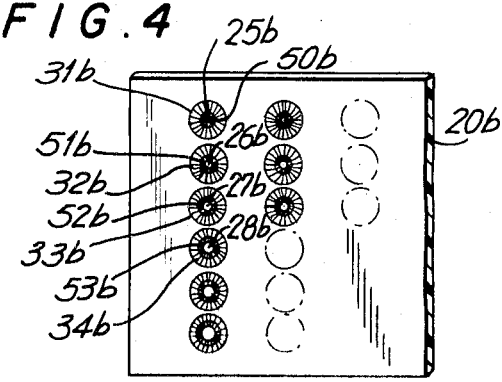
FIG. 4 is a front perspective view showing another slightly modified form of the stage of manufacture of FIGS. 2 and 3.
Figure 7:
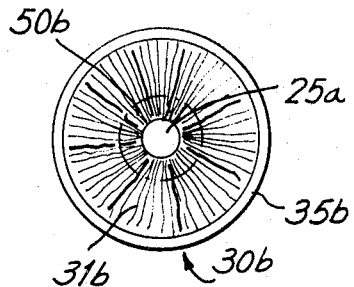
FIG. 7 is a later stage in the manufacture of the intermediate product of FIG. 4.

In the embodiment shown in FIGS. 4 and 7, a clear plastic sheet 20b is imprinted with a plurality of iris-simulations 31b, 32b, 33b and 34b, each of an annular configuration and all may be of the same external diameter, but of successively increasing internal diameters. Prior to imprinting of the iris simulations 31b–34b, the sheet 20b is imprinted with annuli of opaque material, corresponding to the annuli 21–24 of the first-described embodiment. However, the underlying opaque annuli have their internal diameters each respectively larger than the internal diameters of the iris-simulating annuli. Thus, the central regions 25b, 26b, 27b and 28b of respective iris simulations are clear. However, the imprinting material of the iris simulations is of a semi-transparent type, so that the intermediate regions 50b, 51b, 52b and 53b, corresponding to the intermediate regions 50–53 of FIG. 3, are the light transmitting in character, while presenting the appearance of an inner iris region.

The several imprinted areas of sheet 20b are removed therefrom, as by die-cutting or the like, to define a lens part 30b of FIG. 7 having a clear peripheral margin 35b surrounding an iris-simulating imprint 31b. The major, outer portion of the iris-simulating imprint 31b is opaque, by reason of its underlying opaque imprint, while the inner iris region 50b, a region intermediate the central pupillary region 25b and major iris region 31b, is light transmitting though diffusing. This permits increased light to reach the wearer's eye, at the same time enhancing the esthetic effect of the overall lens.

Perhaps the most impeccable embodiment, from a cosmetic point of view would be to imprint the annular regions 50–53 of FIG. 6 in the same manner as the regions 50b–53b of FIG. 7. In this embodiment the intermediate annular regions 50–53 would be of light transmitting and diffusing character, thus permitting of increased transmission of light without detracting from the superior esthetic effect or advantageous therapeutic effect of the central pupillary region.

Figure 11:
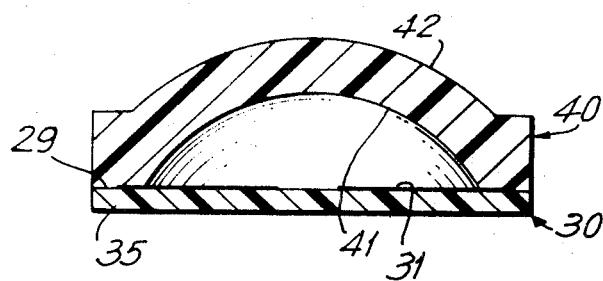
FIG. 11 is a sectional view showing initial assembly of the component part of FIG. 10 with one of the components of FIGS. 5–7.

Of course, the modified lens parts 30a and 30b may be combined with the lens part 40 of FIG. 10 in the manner of FIGS. 11–13 to produce a finished contact lens.

From the foregoing, it is seen that the present invention provides a contact-lens construction and method of manufacture which fully accomplishes its intended objects and is well adapted to meet practical conditions of use.

Although the present invention has been described in some detail by way of illustration and example for purposes of clarity of understanding, it is understood that certain changes and modifications may be made within the spirit of the invention and scope of the appended claim.

What is claimed is:

1. A contact-lens construction comprising a generally circular outer lens part having a concave rear face, a generally circular inner lens part having a convex front face contoured complementary to said rear face of said outer lens part, said front face having a clear pupillary central area and a concentric frosted area extending from said clear pupillary area to a concentric peripheral opaque region, an annular configuration of iris simulating imprinting concentrically disposed on one of said rear or front faces, said iris simulating imprinting being semitransparent and extending radially outwardly from said clear pupillary central area overlapping said frosted area and said opaque region, said outer and inner lens parts being intimately secured together with said complementary front and rear faces sandwiching said imprinting to provide a simulated iris.

References Cited
UNITED STATES PATENTS

| 1,985,170 | 12/1934 | Jeanneret | 351—53 |
| 3,454,332 | 7/1969 | Siegel | 351—160 X |
| 1,993,121 | 3/1935 | Travers. | |

FOREIGN PATENTS

| 699,736 | 11/1953 | Great Britain. |
| 167,273 | 12/1950 | Austria. |

DAVID H. RUBIN, Primary Examiner

U.S. Cl. X.R.

351—162, 177